United States Patent
Snagg (10) Patent No.: US 10,348,878 B2
(45) Date of Patent: Jul. 9, 2019

(54) WIRELESS COMMUNICATION HEADSET SYSTEM

(71) Applicant: Ronald Snagg, Rosedale, NY (US)

(72) Inventor: Ronald Snagg, Rosedale, NY (US)

(*) Notice: Subject to any disclaimer, the term of this patent is extended or adjusted under 35 U.S.C. 154(b) by 0 days.

(21) Appl. No.: 15/838,515

(22) Filed: Dec. 12, 2017

(65) Prior Publication Data

US 2019/0182373 A1 Jun. 13, 2019

(51) Int. Cl.
| | |
|---|---|
| *H04B 7/00* | (2006.01) |
| *H04M 1/60* | (2006.01) |
| *H04W 4/08* | (2009.01) |
| *H04B 1/38* | (2015.01) |
| *H04W 72/02* | (2009.01) |
| *H04W 76/14* | (2018.01) |
| *H04W 4/80* | (2018.01) |

(52) U.S. Cl.
CPC ............ *H04M 1/6066* (2013.01); *H04B 1/38* (2013.01); *H04W 4/08* (2013.01); *H04W 4/80* (2018.02); *H04W 72/02* (2013.01); *H04W 76/14* (2018.02)

(58) Field of Classification Search
CPC ............ H04W 4/10; H04W 4/08; H04W 4/06
USPC ................ 455/575.2, 556.1, 559.1
See application file for complete search history.

(56) References Cited

U.S. PATENT DOCUMENTS

| | | | |
|---|---|---|---|
| 3,939,418 A | 2/1976 | Morrison | |
| D318,053 S | 7/1991 | Ludeke | |
| 6,522,765 B1 | 2/2003 | Towle | |
| 7,110,800 B2 | 9/2006 | Nagayasu | |
| 7,844,220 B2 | 11/2010 | Wang | |
| 9,668,290 B1* | 5/2017 | Snagg | ............... H04W 12/04 |
| 2008/0170740 A1 | 7/2008 | Gantz | |
| 2008/0261564 A1* | 10/2008 | Logan | ............... G08B 13/1427 |
| | | | 455/413 |
| 2015/0081067 A1 | 3/2015 | Yeh | |
| 2016/0105522 A1* | 4/2016 | Somani | ............... H04L 63/0884 |
| | | | 709/219 |
| 2016/0373899 A1* | 12/2016 | Celinski | ............... G06F 3/162 |
| 2017/0181206 A1* | 6/2017 | Lee | ............... H04W 76/14 |

(Continued)

FOREIGN PATENT DOCUMENTS

EP  1722540 A2  11/2006

*Primary Examiner* — Edward F Urban
*Assistant Examiner* — Max Mathew
(74) *Attorney, Agent, or Firm* — Kyle A. Fletcher, Esq.

(57) ABSTRACT

The wireless communication headset system supports private audio communication among a plurality of individual communication devices. The wireless communication headset system supports a community mode of communication and a point to point mode of communication. The wireless communication headset system further comprises a plurality of individual communication devices, one or more transceivers and a plurality of communication links. Each of the one or more transceivers is a repeater device that retransmits an audio message received from a first individual communication device. Each of the plurality of communication links performs a function selected from the group consisting of: 1) establishing a communication channel within an individual communication device; 2) establishing a communication channel between an individual communication device and a master transceiver; and, 3) establishing a communication channel between a first master transceiver and a second master transceiver.

18 Claims, 8 Drawing Sheets

(56) References Cited

U.S. PATENT DOCUMENTS

2018/0270247 A1* 9/2018 Wada ................... G06F 13/00
2018/0343556 A1* 11/2018 Wang ................ H04W 72/0406
2018/0359765 A1* 12/2018 Jung .................... H04W 72/10

* cited by examiner

WIRELESS COMMUNICATION HEADSET SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electric communication techniques including wireless communication networks, more specifically, a short-range facility configured for wireless communication.

SUMMARY OF INVENTION

The wireless communication headset system is a private communication system. The wireless communication headset system supports audio communication among a plurality of individual communication devices. The wireless communication headset system supports a community mode of communication and a point to point mode of communication. The community mode of the wireless communication headset system is a broadcast model of communication. An audio message sent by an individual communication device selected from the plurality of individual communication devices is received by all individual communication devices contained within the plurality of individual communication devices. The point to point mode allows for private communication between a first individual communication device selected from the plurality of individual communication devices and a second individual communication device selected from the plurality of individual communication devices. By private communication is meant that the remaining individual communication devices in the plurality of individual communication devices will not receive private messages communicated between the first individual communication device and the second individual communication device. The wireless communication headset system further comprises one or more transceivers and a plurality of communication links. Each of the one or more transceivers is a repeater device that retransmits an audio message received from a first individual communication device. Each of the plurality of communication links performs a function selected from the group consisting of: 1) establishing a communication channel within an individual communication device selected from the plurality of individual communication devices; 2) establishing a communication channel between an individual communication device selected from the plurality of individual communication devices and a master transceiver selected from the one or more master transceivers; and, 3) establishing a communication channel between a first master transceiver selected from the one or more master transceivers and a second master transceiver selected from the one or more master transceivers.

These together with additional objects, features and advantages of the wireless communication headset system will be readily apparent to those of ordinary skill in the art upon reading the following detailed description of the presently preferred, but nonetheless illustrative, embodiments when taken in conjunction with the accompanying drawings.

In this respect, before explaining the current embodiments of the wireless communication headset system in detail, it is to be understood that the wireless communication headset system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wireless communication headset system.

It is therefore important that the claims be regarded as including such equivalent construction insofar as they do not depart from the spirit and scope of the wireless communication headset system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 8.

The wireless communication headset system 100 (hereinafter invention) is a private communication system. The invention 100 supports audio communication among a plurality of individual communication devices 101. The invention 100 supports a community mode of communication and a point to point mode of communication. The community mode of the invention 100 is a broadcast model of communication. An audio message sent by an individual communication device selected from the plurality of individual communication devices 101 is received by all individual communication devices contained within the plurality of individual communication devices 101. The point to point mode allows for private communication between a first individual communication device selected from the plurality of individual communication devices 101 and a second individual communication device selected from the plurality of individual communication devices 101. By private communication is meant that the remaining individual communication devices in the plurality of individual communication devices 101 will not receive private messages communicated between the first individual communication device and the second individual communication device. The invention 100 further comprises one or more master transceivers and a plurality of communication links 103. Each of the one or more master transceivers is a repeater device that retransmits an audio message received from a first individual communication device. Each of the plurality of communication links 103 performs a function selected from the group consisting of: 1) establishing a communication channel within an individual communication device selected from the plurality of individual communication devices 101; 2) establishing a communication channel between an individual communication device selected from the plurality of individual communication devices 101 and a master transceiver selected from the one or more master transceivers 102; and, 3) establishing a communication channel between a first master transceiver 171 selected from the one or more master transceivers 102 and a second master transceiver 172 selected from the one or more master transceivers 102.

Each of the plurality of communication links 103 is a communication channel used by the invention 100. Each of the plurality of communication links 103 forms a secure communication link selected from the group consisting of: 1) an intradevice communication link within an individual communication device selected from the plurality of individual communication devices 101; 2) a communication link between an individual communication device selected from the plurality of individual communication devices 101 and a master transceiver selected from the one or more master transceivers 102; and, 3) a communication link between any master transceiver selected from the one or more master transceivers 102 and any second master transceiver 172 selected from the one or more master transceivers 102.

Each communication link selected from the plurality of communication links 103 is secured using a security method selected from the group consisting of: 1) a hardwired communication connection; or, 2) the use of an encryption protocol for wireless communication connections.

The plurality of communication links 103 comprises a first plurality of wireless communication links 131, a second plurality of wireless communication links 132, and a hardwired communication network 133.

Each of the first plurality of wireless communication links 131 is an encrypted wireless communication link. Each of the first plurality of wireless communication links 131 forms a communication link between the personal data device 112 of a selected individual communication device with its associated client headset 111. In the first potential embodiment of the disclosure, each of the first plurality of wireless communication links 131 uses a Bluetooth protocol.

Each of the second plurality of wireless communication links 132 is an encrypted wireless communication link. Each of the second plurality of wireless communication links 132 forms a communication link between the personal data device 112 of a selected individual communication device with a master transceiver selected from the one or more master transceivers 102. In the first potential embodiment of the disclosure, each of the second plurality of wireless communication links 132 uses a WiFi protocol.

The hardwired communication network 133 forms an electronic communication network that interconnects each of the one or more master transceivers 102. In the first potential embodiment of the disclosure, the hardwired communication network 133 uses a protocol selected from the group consisting of a USB based protocol or an Ethernet (IEEE 802.3) protocol. A communication received from a first individual communication device associated with a first master transceiver 172 selected from the one or more master transceivers 102 will be transferred to one or more individual communication devices associated with a second master transceiver 172 selected from the one or more master transceivers 102 using the hardwired communication network 133.

Each of the plurality of individual communication devices 101 is a handheld logical device that is carried by an individual. Each of the plurality of individual communication devices 101 forms a portal into the private communication system created by the invention 100. Each of the plurality of individual communication devices 101 is associated with a master transceiver selected from the one or more master transceivers 102 in a one to one fashion. Specifically each of the plurality of individual communication devices 101 is assigned to one master transceiver selected from the one or more master transceivers 102. Each individual communication device comprises a client headset 111 and a personal data device 112.

The client headset 111 is a headphone. The client headset 111 is a finding that is worn by a user. The client headset 111 provides the user with hands free access to the private communication system generated by the invention 100 using spoken messages. The client headset 111 connects to the personal data device 112 using an encrypted first wireless communication link selected from the first plurality of wireless communication links 131. The client headset 111 comprises a client microphone 141, a client speaker 142, and a client switch 143.

The client microphone 141 is a transducer. The client microphone 141 receives acoustic energy from the user and converts the received acoustic energy into electrical signals. The electrical signals generated by the client microphone 141 are transmitted to the personal data device 112 over the first wireless communication device 151.

The client speaker 142 is a transducer. The client speaker 142 receives electrical signals from the first wireless communication device 151. The client speaker 142 converts the received electrical signals into acoustic energy that can be heard by a user.

The client switch 143 is a momentary switch. The client switch 143 is used to signal a change of communication mode from: 1) the community mode to the point to point mode; or, 2) the point to point mode to the community mode. When the client switch 143 is actuated, the master transceiver associated with the client switch 143 establishes a point to point connection between the personal data device 112 associated with the client switch 143 and the last personal data device 112 that transmitted a message in the community mode.

Each individual communication device selected from the plurality of individual communication devices 101 is a personal data device 112. Each personal data device 112 is a programmable electrical device that provides data management and communication services through one or more functions referred to as an application 153. The application 153 is a set of logical operating instructions that are performed by the personal data device 112. The addition of an application 153 will provide increased functionality for the personal data device 112. This disclosure assumes that an application 153 has been developed to interact with the one or more master transceivers 102. Methods to design and implement an application 153 on a personal data device 112 are well known and documented in the electrical arts.

The personal data device 112 manages the communication between the client headset 111 and a master transceiver selected from the one or more master transceivers 102. The personal data device 112 uses an encrypted second wireless communication link selected from the second plurality of wireless communication links 132 to communicate with the selected master transceiver. The personal data device 112 further comprises a first wireless communication device 151, a second wireless communication device 152, and an application 153.

The first wireless communication device 151 is a wireless communication device provisioned with the personal data device 112. The first wireless communication device 151 creates the first wireless communication link selected from the first plurality of wireless communication links 131 associated with the personal data device 112. In the first potential embodiment of the disclosure, the first wireless communication device 151 is a Bluetooth device.

The second wireless communication device 152 is a wireless communication device provisioned with the personal data device 112. The second wireless communication device 152 creates the second wireless communication link selected from the second plurality of wireless communication links 132 associated with the personal data device 112. The second wireless communication device 152 is a WiFi device.

The application 153 is a set of logical instructions used by the personal data device 112. The application 153 turns the personal data device 112 into a repeater that transfers communication messages between the first wireless communication device 151 and the second wireless communication device 152.

Each of the one or more master transceivers 102 manages a communication selected from the group consisting of: 1) communication between a first individual communication device selected from the plurality of individual communication devices 101 and each of the remaining individual communication devices remaining in the plurality of individual communication devices 101 (community mode); 2) communication between a first individual communication device selected from the plurality of individual communication devices 101 and a second individual communication device selected from the plurality of individual communication devices 101 (private mode); and, 3) communication between a first master transceiver 171 selected from the one or more master transceivers 102 and a second master transceiver 172 selected from the one or more master transceivers 102.

Each master transceiver selected from the one or more master transceivers 102 will support multiple individual communication devices selected from the plurality of individual communication devices 101. Each of the one or more master transceivers 102 is an electronic device. Each of the one or more master transceivers 102 is identical. Each of the one or more master transceivers 102 comprises a master logic module 121, a master communication module 122, and a master supervisory headset 123.

The master logic module 121 is a readily and commercially available programmable electronic device that is used to manage, regulate, and operate the selected master transceiver. Depending on the specific design and the selected components, the master logic module 121 can be a separate component within the selected master transceiver or the functions of the master logic module 121 can be incorporated into another component within the selected master transceiver. The master communication module 122 is a wireless electronic communication device. Specifically, the master communication module 122 establishes a second wireless communication link between the selected master transceiver and each of the plurality of individual communication devices 101. In the first potential embodiment of the disclosure the master communication module 122 supports a WiFi protocol.

The master supervisory headset 123 is a headphone that attaches to the master logic module 121 such that the master logic module 121 is the audio source for the master supervisory headset 123. The master supervisory headset 123 allows for the monitoring of all communications transmitted by the invention 100. In the first potential embodiment of the disclosure, the master supervisory headset 123 monitors all transmitted messages regardless of communication mode. The master supervisory headset 123 comprises a supervisory microphone 161 and a supervisory speaker 162.

The supervisory microphone 161 is a transducer. The supervisory microphone 161 receives acoustic energy from a supervisor and converts the received acoustic energy into electrical signals. The electrical signals generated by the supervisory microphone 161 are transmitted to the plurality of individual communication devices 101 over the second plurality of wireless communication links 132 and to the one or more master transceivers 102 over the hardwired communication network 133.

The supervisory speaker 162 is a transducer. The supervisory speaker 162 receives electrical signals from the master logic module 121. The supervisory speaker 162 converts the received electrical signals into acoustic energy that can be heard by the supervisor.

Figure 1:
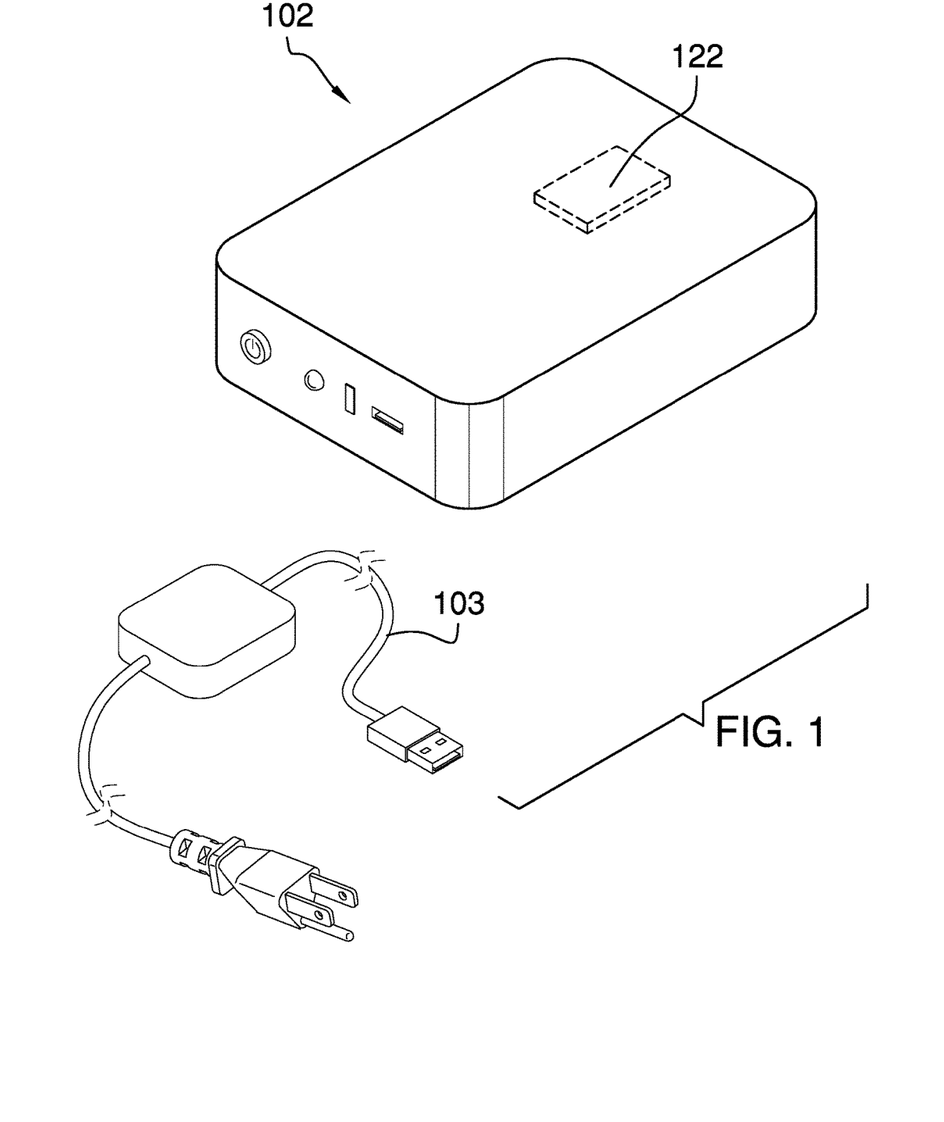
FIG. 1 is a perspective view of an embodiment of the disclosure.
Figure 2:
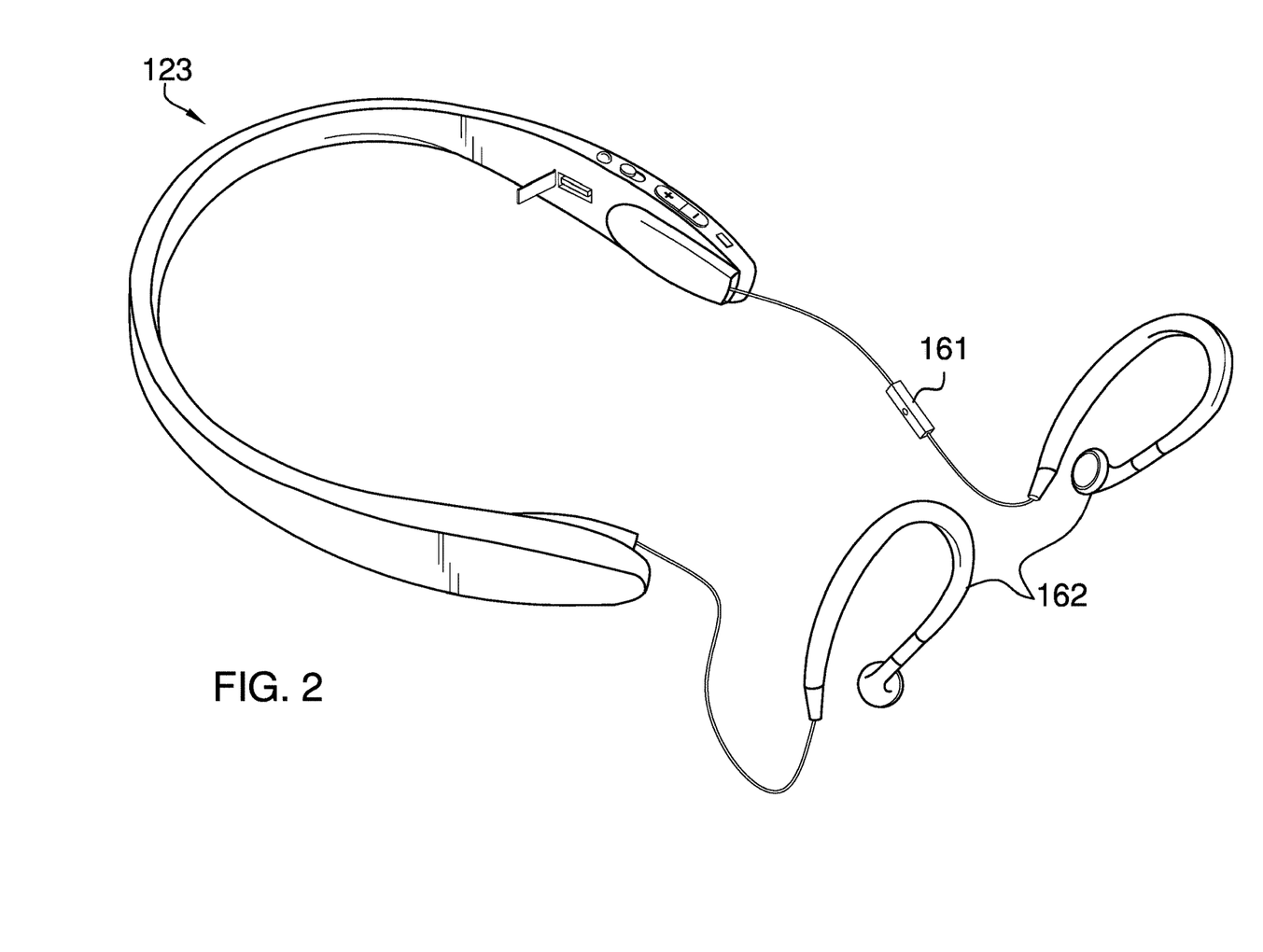
FIG. 2 is a detail view of an embodiment of the disclosure.
Figure 3:
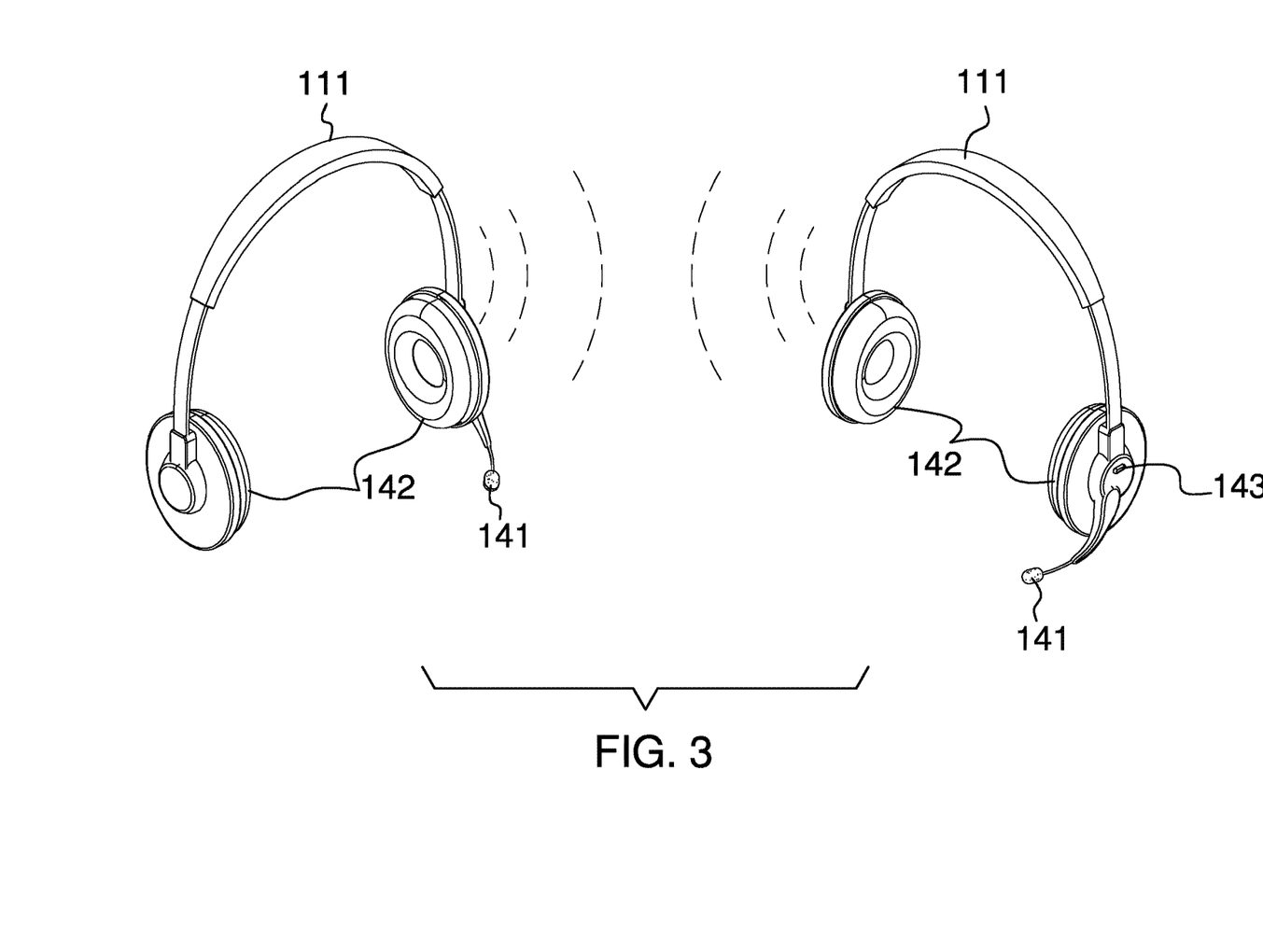
FIG. 3 is a detail view of an embodiment of the disclosure.
Figure 4:
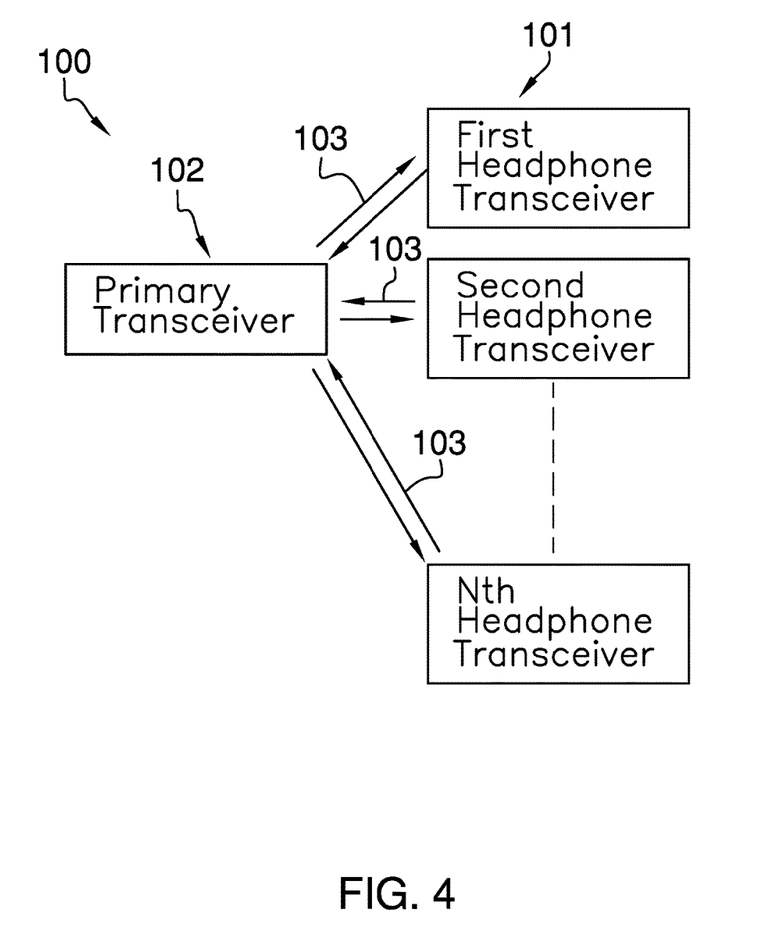
FIG. 4 is a top view of an embodiment of the disclosure.
Figure 5:
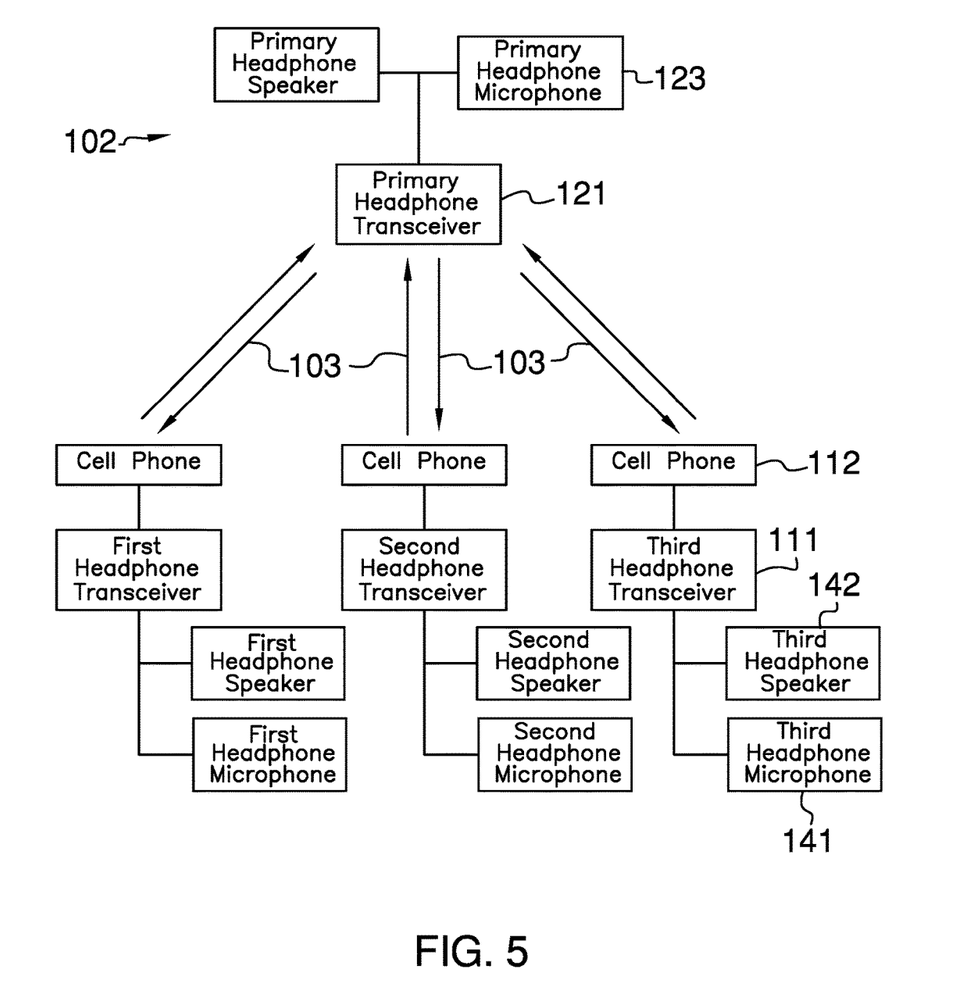
FIG. 5 is a block diagram of an embodiment of the disclosure.
Figure 6:
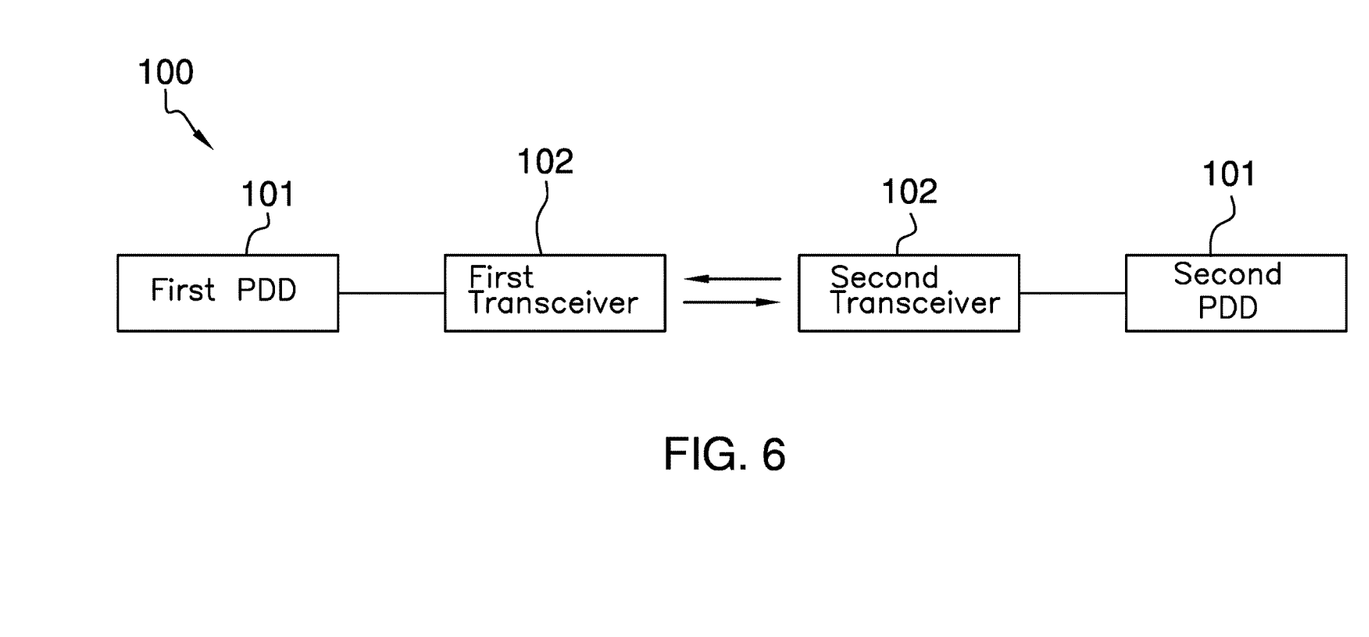
FIG. 6 is a block diagram of an embodiment of the disclosure.
Figure 7:
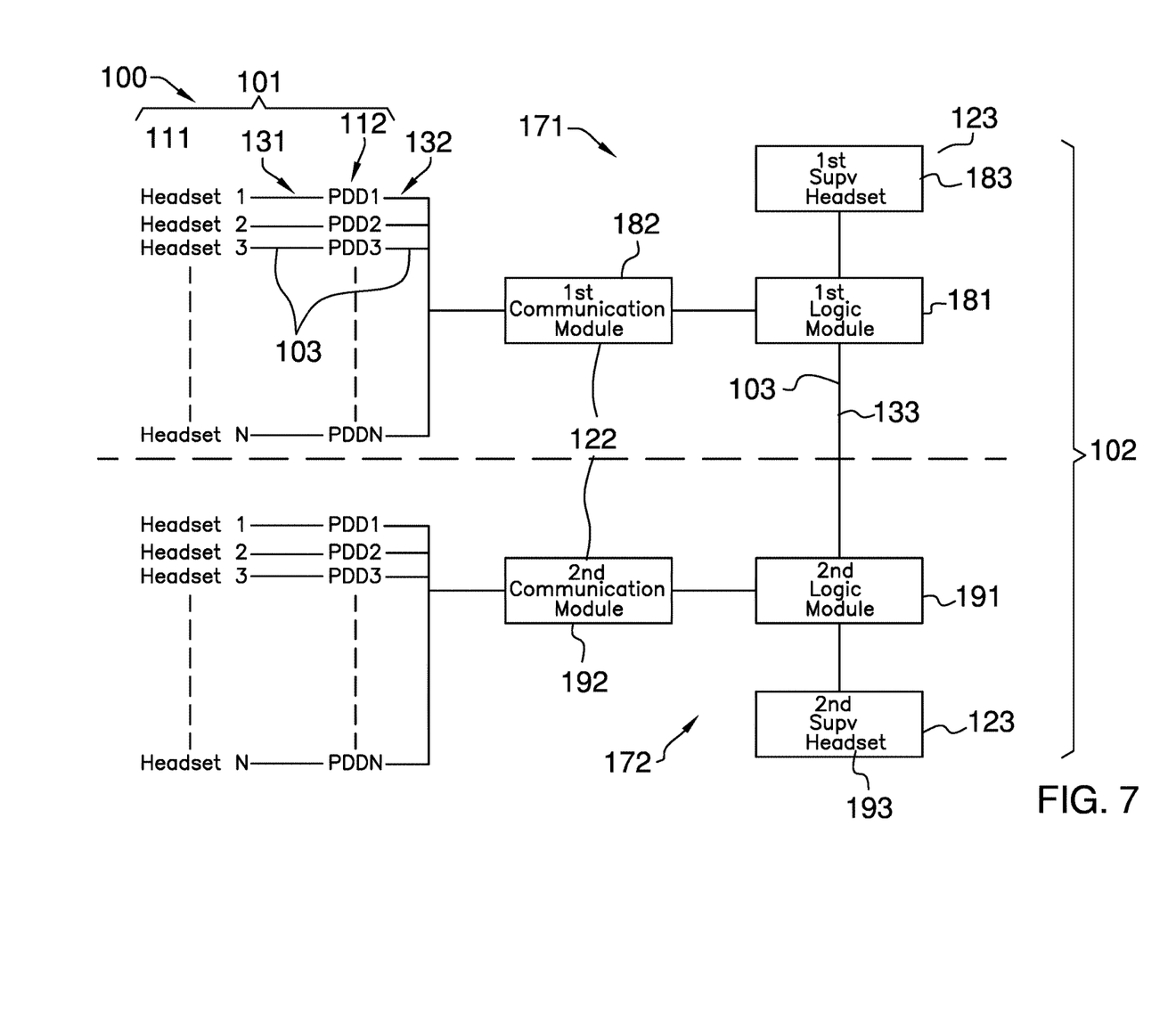
FIG. 7 is a block diagram of an embodiment of the disclosure.
Figure 8:
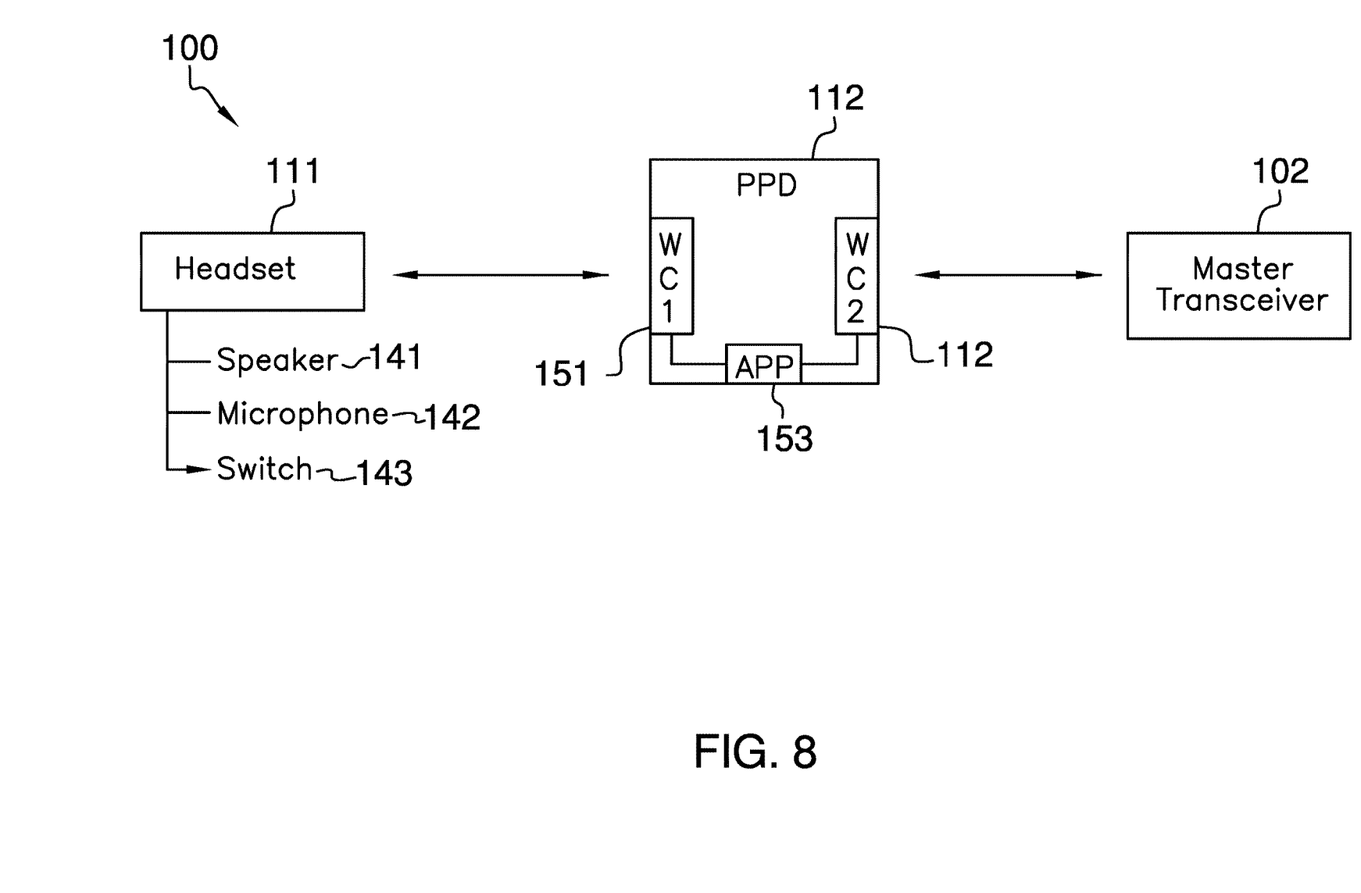
FIG. 8 is a block diagram of an embodiment of the disclosure.

In the first potential embodiment of the disclosure, as shown most clearly in FIG. 7, the one or more master transceivers 102 comprises a first master transceiver 171 and a second master transceiver 172.

The first master transceiver 171 is a master transceiver selected from the one or more master transceivers 102. The first master transceiver 171 further comprises a first logic module 181, a first communication module 182, and a first supervisory headset 183. The first logic module 181 is the master logic module 121 of the first master transceiver 171. The first communication module 182 is the master communication module 122 of the first master transceiver 171. The first supervisory headset 183 is the master supervisory headset 123 of the first master transceiver 171.

The second master transceiver 172 is a master transceiver selected from the one or more master transceivers 102. The second master transceiver 172 further comprises a second logic module 191, a second communication module 192, and a second supervisory headset 193. The second logic module 191 is the master logic module 121 of the second master transceiver 172. The second communication module 192 is the master communication module 122 of the second master transceiver 172. The second supervisory headset 193 is the master supervisory headset 123 of the second master transceiver 172.

The following definitions were used in this disclosure:

Application or App: As used in this disclosure, an application or app is a self-contained piece of software that is specially designed or downloaded for use with a personal data device.

Audio Source: As used in this disclosure, an audio source is a device that generates electrical signals that can be converted into audible sounds by a speaker.

Bluetooth: As used in this disclosure, Bluetooth is a standardized communication protocol that is used to wirelessly interconnect electronic devices.

Cable: As used in this disclosure, a cable is a collection of insulated wires covered by a protective casing that is used for transmitting electricity or telecommunication signals.

Correspond: As used in this disclosure, the term correspond is used as a comparison between two or more objects wherein one or more properties shared by the two or more objects match, agree, or align within acceptable manufacturing tolerances.

Earphone: As used in this disclosure, an earphone refers to a device that converts electrical signals into audible sounds that are worn or listened to in contact with the ear.

Ethernet: As used in this disclosure, Ethernet refers to the IEEE standard 802.3 that defines a hardwired communication network between logical devices.

Findings: As used in this disclosure, findings are small decorative elements, fasteners, or tools for fit, function, or adjustment that are used with apparel or footwear.

Handheld: As used in this disclosure, when referring to an item or device, handheld means that the item or device is small and light enough to be operated while a person holds the item or device in their hands.

Hands Free: As used in this disclosure, hands free refers to a design characteristic of a device that allows the device to be used or operated without the use of the hands.

Hardwired: As used in this disclosure, the term hardwired refers to a physical electrical connection, generally using cable, between two electrical circuits or circuit elements. Such a hardwired connection is considered more reliable than a wireless connection.

Headphone: As used in this disclosure, a headphone is a device that comprises one or two earphones that are held to the ear, typically through the use of a band placed on top of the head. The headphone comprises one or more speakers and an optional microphone to allow for: 1) private access to an audio communication system; and, 2) hands free access to an audio communication system. Headset is a synonym for headphone.

IEEE: As used in this disclosure, the IEEE (pronounced "I triple E") is an acronym for the Institute of Electrical and Electronic Engineers.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Logical Device: As used in this disclosure, a logical device is a programmable electrical device that processes externally provided inputs to generate outputs that are determined from a previously programmed set of instructions.

Microphone: As used in this disclosure, a microphone is a transducer that converts the energy from vibration into electrical energy. The sources of vibrations include, but are not limited to, acoustic energy.

Momentary Switch: As used in this disclosure, a momentary switch is a biased switch in the sense that the momentary switch has a baseline position that only changes when the momentary switch is actuated (for example when a pushbutton switch is pushed). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Network: As used in this disclosure, a network refers to a data communication or data exchange structure where data is electronically transferred between nodes, also known as terminals, which are electrically attached to the network. In common usage, the operator of the network is often used as an adjective to describe the network. For example, a telecommunication network would refer to a network run by a telecommunication organization while a banking network will refer to a network operated by an organization involved in banking.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

PDD: As used in this disclosure, PDD is an acronym for personal data device.

Personal Data Device: As used in this disclosure, a personal data device is a handheld logical device used for managing personal information and communication. Examples of personal data device include, but are not limited to, cellular phones, tablets, and smartphones.

Repeater: As used in this disclosure, a repeater is an electrical device that receives a first signal from a first communication channel and transmits a duplicate second signal over a second communication channel. When a radio frequency wireless communication channel is used as both the first communication channel and the second communication channel the frequencies of operation of the first communication channel and the second communication channels may or may not be identical.

Speaker: As used in this disclosure, a speaker is an electrical transducer that converts an electrical signal into an audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transceiver: As used in this disclosure, a transceiver is a device that is used to transmit and receive radio signals.

Transducer: As used in this disclosure, a transducer is a device that converts a physical quantity, such as pressure or brightness into an electrical signal or a device that converts an electrical signal into a physical quantity.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

WiFi: As used in this disclosure, WiFi refers to the physical implementation of a collection of wireless electronic communication standards commonly referred to as IEEE 802.11x.

Wireless: As used in this disclosure, wireless is an adjective that is used to describe a communication channel between two terminals that does not require the use of physical cabling.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A communication facility comprising:
a plurality of individual communication devices, one or more master transceivers, and a plurality of communication links;
wherein the plurality of communication links interconnect the plurality of individual communication devices and one or more master transceivers
wherein the communication facility is a private communication system;
wherein the communication facility supports audio communication among the plurality of individual communication devices;
wherein the communication facility supports a community mode of communication and a point to point mode of communication;
wherein the community mode allows for communication from an individual communication device selected from the plurality of individual communication devices to be received by all individual communication devices contained within the plurality of individual communication devices;
wherein the point to point mode allows for direct communication between a first individual communication device selected from the plurality of individual communication devices and a second individual communication device selected from the plurality of individual communication devices;
wherein each of the plurality of individual communication devices is a handheld logical device;
wherein each of the plurality of individual communication devices forms a portal into the communication facility;
wherein each of the plurality of individual communication devices is associated with a master transceiver selected from the one or more master transceivers in a one to one fashion;
wherein each of the one or more master transceivers is a repeater;
wherein each of the one or more master transceivers retransmits an audio message received from a first individual communication device selected from the plurality of individual communication devices;
wherein each master transceiver selected from the one or more master transceivers supports multiple individual communication devices selected from the plurality of individual communication devices;
wherein each of the one or more master transceivers is an electronic device;
wherein each of the one or more master transceivers is identical.

2. The communication facility according to claim 1
wherein each of the plurality of communication links is a communication channel used by the communication facility;
wherein each of the plurality of communication links performs a function selected from the group consisting of: A) establishing a communication channel within an individual communication device selected from the plurality of individual communication devices; B) establishing a communication channel between an individual communication device selected from the plurality of individual communication devices and a master transceiver selected from the one or more master transceivers; and, C) establishing a communication channel between a first master transceiver selected from the one or more master transceivers and a second master transceiver selected from the one or more master transceivers.

3. The communication facility according to claim 2 wherein each of the plurality of communication links forms a secure communication link selected from the group consisting of: A) a secure intradevice communication link within an individual communication device selected from the plurality of individual communication devices; B) a secure communication link between an individual communication device selected from the plurality of individual communication devices and a master transceiver selected from the one or more master transceivers; and, C) a secure communication link between any master transceiver selected from the one or more master transceivers and any second master transceiver selected from the one or more master transceivers.

4. The communication facility according to claim 3 wherein each communication link selected from the plurality of communication links is secured using a security method selected from the group consisting of: A) a hardwired communication connection; or, B) the use of an encryption protocol for wireless communication connections.

5. The communication facility according to claim 4 wherein the plurality of communication links comprises a first plurality of wireless communication links, a second plurality of wireless communication links, and a hardwired communication network;

wherein each of the first plurality of wireless communication links forms a communication link between the personal data device of a selected individual communication device with its associated client headset;

wherein each of the second plurality of wireless communication links forms a communication link between the personal data device of a selected individual communication device with a master transceiver selected from the one or more master transceivers;

wherein the hardwired communication network forms an electronic communication network that interconnects each of the one or more master transceivers.

6. The communication facility according to claim 5 wherein a communication received from a first individual communication device associated with a first master transceiver selected from the one or more master transceivers is transferred to one or more individual communication devices associated with a second master transceiver selected from the one or more master transceivers using the hardwired communication network.

7. The communication facility according to claim 6 wherein each of the first plurality of wireless communication links is an encrypted wireless communication link;

wherein each of the second plurality of wireless communication links is an encrypted wireless communication link.

8. The communication facility according to claim 7 wherein each individual communication device comprises a client headset and a personal data device;

wherein the client headset is connected to the personal data device;

wherein the client headset provides hands free access to the communication facility;

wherein the personal data device manages the communication between the client headset and a master transceiver selected from the one or more master transceivers;

wherein the personal data device uses an encrypted second wireless communication link selected from the second plurality of wireless communication links to communicate with the selected master transceiver;

wherein the client headset is a headphone;

wherein the client headset is a finding;

wherein the client headset connects to the personal data device using a first wireless communication link selected from the first plurality of wireless communication links.

9. The communication facility according to claim 8 wherein the client headset comprises a client microphone, a client speaker, and a client switch;

wherein the client microphone, the client speaker and the client switch are interconnected;

wherein the client microphone is a transducer;

wherein the client speaker is a transducer;

wherein the electrical signals generated by the client microphone are transmitted to the personal data device over the first wireless communication device;

wherein the client speaker receives electrical signals from the first wireless communication device;

wherein the client speaker converts the received electrical signals into acoustic energy;

wherein the client switch is a momentary switch;

wherein the client switch is used to signal a change of communication mode between the community mode and the point to point mode.

10. The communication facility according to claim 9 wherein the personal data device is a logical device;

wherein the personal data device manages the communication between the client headset and a master transceiver selected from the one or more master transceivers.

11. The communication facility according to claim 10 wherein the personal data device further comprises a first wireless communication device, a second wireless communication device, and an application;

wherein the first wireless communication device is a wireless communication device provisioned with the personal data device;

wherein the second wireless communication device is a wireless communication device provisioned with the personal data device;

wherein the first wireless communication device creates the first wireless communication link selected from the first plurality of wireless communication links associated with the personal data device;

wherein the second wireless communication device creates the second wireless communication link selected from the second plurality of wireless communication links associated with the personal data device;

wherein the application is a set of logical instructions used by the personal data device;

wherein the application turns the personal data device into a repeater that transfers communication messages between the first wireless communication device and the second wireless communication device.

12. The communication facility according to claim 11 wherein each of the one or more master transceivers manages a communication selected from the group consisting of: A) communication between a first individual communication device selected from the plurality of individual communication devices and each of the remaining individual communication devices remaining in the plurality of individual communication devices; B) communication between a first individual communication device selected from the plurality of individual communication devices and a second individual communication device selected from the plurality of individual communication devices; and, C) communication between a first master transceiver selected from the one or more master transceivers and a second master transceiver selected from the one or more master transceivers.

13. The communication facility according to claim 12 wherein each of the one or more master transceivers comprises a master logic module, a master communication module, and a master supervisory headset;

wherein the master logic module, the master communication module, and the master supervisory headset are electrically interconnected;

wherein the master logic module is a programmable electronic device;

wherein the master communication module is a wireless electronic communication device.

14. The communication facility according to claim 13 wherein the master communication module establishes a second wireless communication link between the selected master transceiver and each of the plurality of individual communication devices;

wherein the master supervisory headset is a headphone that attaches to the master logic module such that the master logic module is the audio source for the master supervisory headset.

15. The communication facility according to claim 14 wherein the master supervisory headset monitors all transmitted messages regardless of communication mode.

16. The communication facility according to claim 15
wherein the master supervisory headset comprises a supervisory microphone and a supervisory speaker;
wherein the supervisory microphone and the supervisory speaker are electrically interconnected;
wherein the supervisory microphone is a transducer;
wherein the supervisory speaker is a transducer.

17. The communication facility according to claim 16
wherein the supervisory microphone receives acoustic energy from a supervisor and converts the received acoustic energy into electrical signals;
wherein the electrical signals generated by the supervisory microphone are transmitted to the plurality of individual communication devices over the second plurality of wireless communication links and to the one or more master transceivers over the hardwired communication network;
wherein the supervisory speaker is a transducer;
wherein the supervisory speaker converts the received electrical signals into acoustic energy.

18. The communication facility according to claim 17
wherein the one or more master transceivers comprises a first master transceiver and a second master transceiver;
wherein the first master transceiver further comprises a first logic module, a first communication module, and a first supervisory headset;
wherein the second master transceiver further comprises a second logic module, a second communication module, and a second supervisory headset;
wherein the first logic module is the master logic module of the first master transceiver;
wherein the first communication module is the master communication module of the first master transceiver;
wherein the first supervisory headset is the master supervisory headset of the first master transceiver;
wherein the second logic module is the master logic module of the second master transceiver;
wherein the second communication module is the master communication module of the second master transceiver;
wherein the second supervisory headset is the master supervisory headset of the second master transceiver.

* * * * *